United States Patent [19]

Nishimura et al.

[11] Patent Number: 4,698,703
[45] Date of Patent: Oct. 6, 1987

[54] CAPSTAN SERVO SYSTEM

[75] Inventors: Kazuhisa Nishimura; Mitsugu Yoshihiro; Masaaki Sakai; Seiichi Hataoka, all of Kanagawa, Japan

[73] Assignee: Sony Corporation, Tokyo, Japan

[21] Appl. No.: 887,954

[22] Filed: Jul. 22, 1986

[30] Foreign Application Priority Data

Jul. 23, 1985 [JP] Japan .................................. 60-162274
Nov. 13, 1985 [JP] Japan .................................. 60-254525

[51] Int. Cl.⁴ .......................................... G11B 15/46
[52] U.S. Cl. ................................................. 360/73
[58] Field of Search ......................................... 360/73

[56] References Cited

U.S. PATENT DOCUMENTS 4,521,815 6/1985 Tuluyama .............................. 360/73

Primary Examiner—George G. Stellar
Attorney, Agent, or Firm—Lewis H. Eslinger; Alvin Sinderbrand

[57] ABSTRACT

A capstan servo system for a video tape recording and/or reproducing apparatus permits recording of a new video signal precisely commenced at a selected edit point. For this, the capstan servo system is provided a tape speed error dependent feedback control feature and a phase error dependent feedback control feature. Tape speed error dependent feedback control is carried out when the recording and/or reproducing apparatus operates in recording or assemble edit mode. Phase error dependent feedback control is carried out when the recording and/or reproducing apparatus operates in reproducing or playback mode.

13 Claims, 4 Drawing Figures

CAPSTAN SERVO SYSTEM

BACKGROUND OF THE INVENTION

1. Field of the Invention

The present invention relates generally to a capstan servo system for a video tape recorder which will be hereafter referred to as VTR. More specifically, the invention relates to a capstan servo system which permits assemble edits without any transient error at editing points.

2. Description of the Prior Art

Conventional VTRs, of the type having one or more rotating heads which scan the video tape at an angle with respect to the direction of advancement thereof, can be adapted to be set into an editing mode so that a new scene is recorded sequentially and contineously after a previously recorded scene. In such a mode, sometimes called as and assemble mode, the VTR is stopped after one scene is recorded, and another scene is recorded immediately after the one scene. In another mode, simetimes called in insert mode, a new scene is recorder between two scenes which have been recorded on the tape.

In either of the insert and assemble modes, the edit points, i.e., the points connecting the successive scenes, are determined, for example, by an operator viewing the video picture on a monitor. During a usual edit operation, the operator stops the VTR at a selected point by depressing a pause button. When the operator is ready to record the new video material, the VTR is released from its pause mode and is set into its record mode, and a new video scene is recorded begining at the edit point.

Whenever such assemble or insert recording operation is performed, care must be taken to prevent the video signal from generating transisent error at the edit point. In order to avoid such transient error, there is known such capstan servo systems for the VTR.

In a known capstan servo system, a pair of frequency generators are employed for monitoring revolution of a capstan. Each of the frequency generators are adapted to produce a signal having a frequency propotional to the rotation speed of the capstan. This signal will be hereafter referred to as "capstan speed indicative signal". The pair of frequency generators generate capstan speed indicative signals in different phases. The capstan speed indicative signals are input to a well-known speed control circuit having a frequency-to-voltage (F/V) converter. The speed control circuit derives an output voltage for controlling rotation speed of the capstan. The output of the speed control circuit will be hereafter referred to as "capstan speed control voltage". The capstan speed control voltage from the speed control circuit is fed to the capstan motor through an operational amplifier for maintaining the capstan speed constant. Therefore, the capstan motor, the frequency generators, the speed control circuit and the operational amplifier constitute a closed loop for allowing feedback control of the capstan speed.

On the other hand, during reproduction, a reproducted control signal (30 Hz) PB-CTL which is recorded on a tape longitudinally and a reference signal REF of 30 Hz which also serves as a reference for controlling rotation of a head drum motor are input to a phase control circuit which has a comparator for comparing the phases of the reproduced control signal and the reference signal. The comparator thus derives an output serving as a phase-error signal. The phase-error signal from the comparator is input to the opperational amplifier as another input therefor. By this. the phase of rotation of the capstan motor is controlled so that the PB-CLT and REF signal conicide.

The capstan servo system in the prior art also have a counter for counting up the capstan speed indicative signals. During recording (REC), a 30 Hz subharmonic signal indicative of the counter value of the aforementioned counter is applied as a replacement of the reproduced control signal PB-CTL to the phase control circuit through a change-over switch.

In the case of assemble editing (ASS), the tape is rewound to the point slightly before the editing point. Then, the tape is advanced or fed to the editing point in the reproduction or playback (PLAY) mode. The operation mode is switched at the editing point from the reproduction mode (PLay) to the recording mode (REC). In the prior art, the counter is adapted to be reset by the reproduced control signal PB-CTL for forced synchronization in reproduction mode. By this, after the editing point, the counter is self-reset or self-triggered to hold phase information for PB-CTL. Therefore, track will not be discontinuously disrupted at all before and after the editing point.

With regard to such prior art capstant servo system, it is organized on an assumption that the frequency of the capstan speed indicative signal is an integer factor of the reproduced control signal PB-CLT (30 Hz). When the capstan speed indicative signal have frequency not integral of the frequency of the reproduced control signal, continuity in the track of the rape can not be maintained before the after the editing point since the subharmonic output of the counter tends to be varied to the frequency, e.g. 31 Hz, other than the frequency of the reproduced control signal, upon switching from the force-reset condition to the self-triggered condition in response to the reproduced control signal PB-CTL. In order to maintain high servo control accuracy, it is required to machine the mechanical component included in the servo loop, especially in the diameter of the capstan. For instance, if the diameter of the capstan is larger than the standard, even though the tape is moving at a constant speed, the frequency of the capstan speed indicative signal will necessarily become lower, whereby the subharmonic output of the counter will be less than 30 Hz. Also, in such prior art capstan servo system, it is required to produce the frequency generators with high accuracy.

Furthermore, since the phase servo system is maintained inoperative in recording mode (REC) or in assemble mode (ASS), it also encounters another problem that the tape feed rate will deviate from the standard rate due to the capstan diameter machining errors and temperature conditions or secular changes in the speed control circuit.

SUMMARY OF THE INVENTION

Therefore, it is an object of the present invention to provide a capstan servo system for editing a video signal in a manner that avoids the problems encountered with the conventional systems.

Another object of the invention is to provide an improved capstan servo system wherein recording of a new video signal can be commenced precisely at a selected edit point.

A futher object of the invention is to provide such a servo system which permits a simplification of the servo mechanism.

In order to accomplish the aforementioned and other objects, a capstan servo system for a video tape recorder according to the present invention, comprises means for generating pulse trains in response to rotation of a tape capstan, means for controlling a rotation speed of the tape capstan by a control signal having a corresponding magnitude to frequency variation of the pulse trains, means for producing a phase error between a reference pulse and a control track pulse that is recorded in a longitudinal direction of tape, means connected to the generating means for detecting a deviation of the pulse trains from a reference value at every predetermined period, and switching means for supplying output of the producing means to the controlling means in a reproducing mode of the video tape recorder and supplying output of the detecting means to the controlling means in a recording mode thereof.

The detecting means comprises means for counting a number of the pulse trains within the predetermined period and means for comparing output value of the counting means with the reference value.

In the alternative, the detecting means comprises means for counting the pulse trains to predetermined pulse counts and generating a indication pulse representing the predetermined period, means for detecting a time interval that is determined by the indication pulse and means for comparing output value of the time interval detecting means with the reference value. The detecting means further comprises an means for storing the phase error of the producing means in the reproducing mode, the storing means being connected with the detecting means in the recording mode for superimposing the phase error with the output of the detecting means.

The comparing means comprises a digital comparator and the detecting means further comprises a digital to analog converter for converting the output of the digital comparator to the corresponding analog signal and a level shifter for adding a predetermined DC level to the analog signal.

According to another aspect of the invention, a capstan servo system for a video tape recorder, comprises a pulse generator for generating pulse trains in response to rotation speed of capstan motor, circuit connected to the pulse generator for producing a speed error of the capstan motor by detection of frequency variation of the pulse trains, circuit for producing a phase error between a reference pulse and a control track pulse that is recorded in a longitudinal direction of tape, circuit connected to the pulse generator for detecting a deviation of a number of the pulse trains at every predetermined period, a switch circuit for selectively switching between outputs of the phase error producing circuit and the detecting circuit so that the output of the phase error producing circuit is supplied therefrom in a reproducing mode and the output of the detecting means is supplied therefrom in a recording mode, an integrating circuit connected to the switch circuit, and an adder for adding the speed error with an output of the integrating circuit to generate a control signal by which the capstan motor is controlled.

Preferably, the phase error producing circuit further comprises a low-pass-filter to which the phase error is applied and a differential amplifier for subtracting an output of a low-pass-filter from the output of the integrating circuit.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
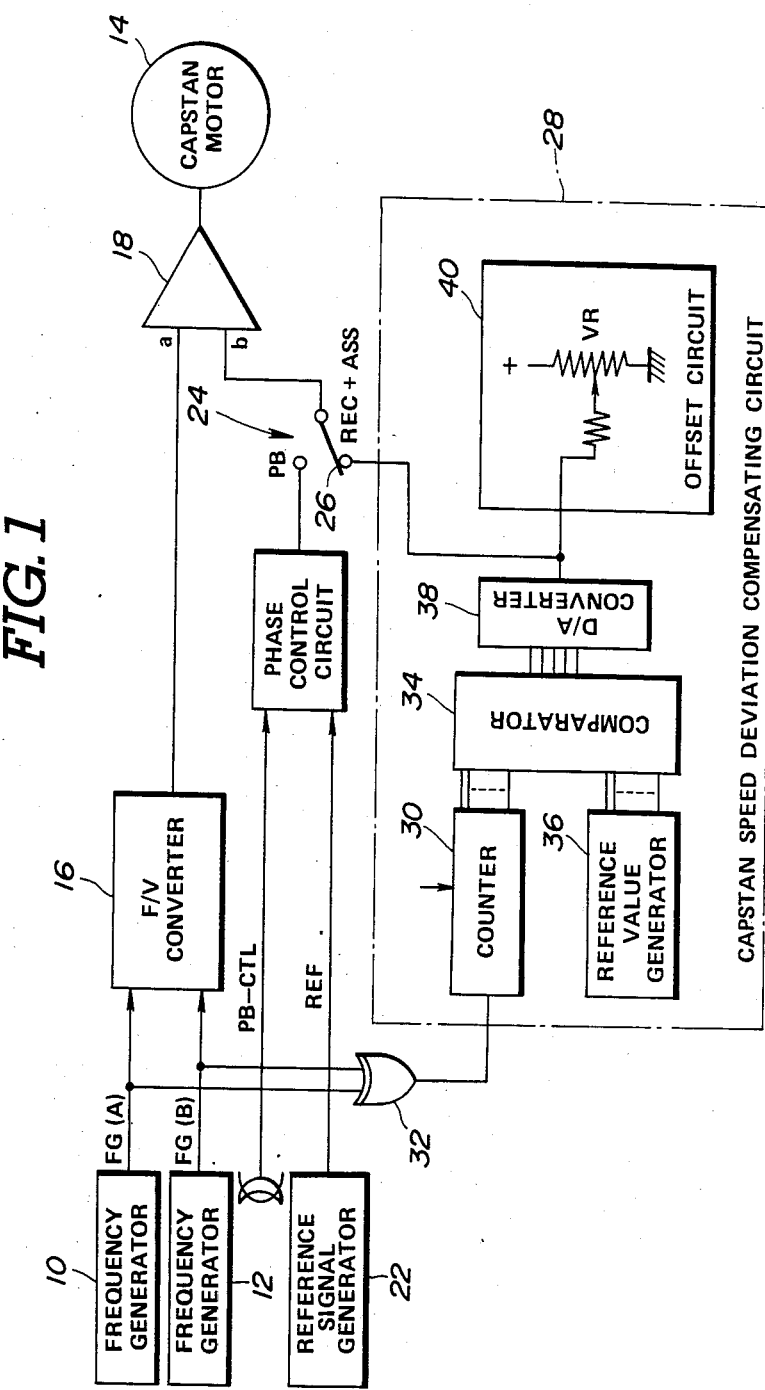
FIG. 1 is a block diagram of the first embodiment of a capstan servo system according to the present invention.

Referring now to the drawings, particularly to FIG. 1, the first embodiment of a capstan servo system according to the prevent invention is provided with a pair of frequency generators 10 and 12. Though it is not clealy shown in the drawings, the frequency generators 10 and 12 are associated with a capstan motor 14 for monitoring revolution thereof. Each of the frequency generators 10 and 12 has a per se well known construction and adapted to be driven by the output of the capstan motor 14 to generate a frequency signal serving as a capstan speed indicative signal and having a frequency variable proportionally to the revolution speed of the capstan motor.

In the shown embodiment, the frequency generators 10 and 12 are adapted to respectively produce a plusetrains which respectively serve as capstant speed indicative signals FG(A) and FG(B). Each of the pulse-trains of the capstan speed indicative signals has a frequency of 450-Hz. In practice, the capstan speed indicative signals FG(A) and FG(B) have phases mutually shifted at 90° from each other. The capstan speed indicative signals FG(A) and FG(B) of the frequency generators 10 and 12 are fed to a frequency-to-voltage (F/V) converter circuit 16. The F/V converter circuit 16 derives a capstant speed indicative voltage signal corresponding to the frequency of the capstan speed indicative signals FG(A) and FG(B) and whereby representative of the rotation speed of the capstan. The capstan speed indicative voltage signal of the F/V converter circuit 16 is input to an a terminal of an adder 18 and then to the capstan motor 14. Therefore, the frequency generators 10 and 12, the capstan speed control circuit 16, the operational amplifier 18 and the capstan motor 14 constitute a feedback loop for performing feedback control for the capstan speed.

On the other hand, a control signal recorded on a magnetic tape is reproduced during reproduction. The reproduced control signal PB-CTL has a 30 Hz of frequency and is fed to a phase control circuit 20. The phase control circuit 20 is also connected to a phase reference signal generator 22 to receive therefrom a phase reference signal REF. The phase control circuit 20 includes a phase comparator to compare the phases of the reproduced control signal PB-CTL and the phase reference signal REF to derive a phase error therebetween. The phase control circuit 20 thus produces a phase error indicative signal based on the derived pahse error. The phase error indicative signal is in a form of the voltage signal. The phase control circuit 20 is connected to one of switching terminals of a change-over switch 24, which one of the switch terminals will be referred to as "PB (playback) terminal". The change-over switch has a movable switch member 26 connected to a b terminal of the adder 18. Therefore, when the movable switch member 26 is shifted to the PB terminal of the change-over switch 24, the phase error indicative signal is fed through the change-over switch 24 to the b terminal of the adder 18. The operational amplifier 18 thus procudes a voltage signal having a voltage corresponding to the sum value of the capstan speed indicative voltage signal and the phase error indicative signal. The sum value indicative voltage signal of the adder 18 serves as a capstant motor control signal for controlling the revolution speed of the capstan motor 14. Therefore, the reproduced control signal phase can be adjusted to coincide with the phase of the phase reference signal.

The other switch terminal of the change-over switch 24, which other switch terminal will be hereafter referred to as "REC-ASS terminal", is connected to a speed deviation compensating circuit 28. The speed deviation compensating circuit 28 is adapted to derive the rotation speed based on the capstan speed indicative signals. In order to derive the capstan speed, the speed deviation compensating circuit 28 counts up occurence of pulses of the capstant speed indicative signals within a given period of time. As an alternative, the speed deviation compensating circuit 28 may measures elapsed period time to count a given number of pulses of the capstan speed indicative signals.

In the practical embodiment, the speed deviation compensating circuit 28 is adapted to count occurence of the pulses of the capstan speed indicative signals FG(A) and FG(B) within a given period of time. The given period of time is set at a relatively-long period (several seconds).

In order to count-up the occurence of the pulses of the capstan speed indicative signals FG(A) and FG(B), the speed deviation compensating circuit 28 is provided with a capstan speed indicative signal counter 30. The capstan speed indicative signal counter 30 is connected to the frequnecy generators 10 and 12 through an exclusive OR (EX-OR) gate 32. The capstan speed indicative signal counter 30 counts up the pulses of the capstan speed indicative signals FG(A) and FG(B) to produce a counter signal. The capstan speed indicative signals FG(A) and FG(B) are thus joined into a doubled-pulse signal by means of EX-OR gate 32. The counting interval (gate period) of the capstant speed indicative signal counter 30 is set at a given period of time, for example, 2 seconds. Therefore, an enabling pulses are generated at intervals of time, e.g. 2 seconds. In response to each enabling signal, the capstan speed indicative signal counter 30 outputs the counter signal indicative of the counter value to a digital comparator 34 (or a subtracter). The digital comparator 34 is also connected to a reference value generator 36 which produces a reference signal indicative of the reference value. The digital comparator 34 compares the counter signal value with the reference signal value. The comparator 34 produces a comparator signal indicative of the difference between the counter signal value and the reference signal value.

The difference indicative comparator signal is converted into analog form by means of a digital-to-analog (D/A) converter 38. The voltage derived by the D/A converter corresponds the capstan speed deviation relative to a predetermined speed represented by the reference value. The voltage will be hereafter referred to as "capstan speed deviation indicative signal". The capstan speed deviation indicative signal is offset by a given value by means of an offset circuit 40. Thereafter, the capstan speed deviation indicative signal is applied to the b terminal of the adder 18 via the REC terminal of the change-over switch 24.

The offset circuit 40 is provided with a variable resistance VR, which functions as an attenuator, and is further used to adjust the gain of the loop including the speed deviation compensating circuit 28.

The speed deviation compensating circuit 28 has no function of compensating for rotational speed variations which occur in a period less than the period of rotation of the capstan, but serves to compensate for systematic capstan speed errors, for examples, due to temperature drift of a capstan speed servo system containing a velocity servo circuit, secular change, tolerances among devices and the like, and converges the speed variations to a constant value.

Assuming that the frequency of capstan speed indicative signal is 450 Hz, the pulses to be input to the capstan speed indicative signal counter 30 are converted to a pulse signal of 900 Hz. Therefore, the capstan speed indicative signal counter 30 will count 1800 pulses in 2 seconds. For this reason, an 11-bit digital counter (2048) is used as the capstan speed indicative signal counter 30. Since accuracy of detection of the capstan speed deviation is $1/1800 = 0.055\%$ per pulse, the capstan speed deviation can be kept to within about $\pm 0.1\%$.

It should be appreciated that since the value of the difference indicative comparator signal of the comparator 34 represents only the deviation, the capacity of the D/A converter 38 may be as small as 5 bits or less.

As set forth above, during assemble editing, the tape is rewound slightly. Thereafter, the recording and/or reproducing apparatus is set in the reproduction or playback (PLAY) mode. Thus, the change-over switch 24 is switched to the switch position to connected the movable switch member 26 to the PB contact. Operation mode of the recording and/or reproducing apparatus is switched from the PLAY mode to the REC mode when the edit point passes the head.

If it is assumed that only the capstan speed servo circuit is operative in this PLAY mode, the capstan motor 14 rotates at the essentially fixed rate. However, the reproduced control signal PB-CTL will be offset from the 30 Hz of phase reference signal generated by the phase reference signal generator 22 due to tolerances in the diameter of the capstan, temperature drift of the set point of the capstan speed servo, secular changes and/or so forth. In this case, if the phase servo circuit is operated, the revolution speed of the capstan motor 14 and the phase of rotation are controlled so that 30 Hz reproduced control signal PB-CTL is accurately synchronized with the reference signal REF. Since the phase error dependent feedback control is performed based on the pahse error between the reproduced control signal PB-CTL and the phase reference signal REF, the tape speed during reproduction will become coincident with the tape speed during recording.

It should be noted that, during recording, the speed of the tape is controlled while the capstan speed deviation compensating circuit 28 is active. The control signal CTL is recorded on the magnetic tape based on a 30-Hz reference signal. Specifically, it may be considered that, in the PLAY mode, the phase servo circuit substitutes for the capstan speed deviation compensating circuit 28. On the other hand, it is considered that, when phase servo is active, the capstan speed indicative signal counter 30 of the capstan speed deviation compensating circuit 28 counts the value corresponding to a reference value, e.g., 1800 pulse/2 seconds. Therefore, during assemble editing, if the change-over switch 24 is switched from the PB terminal to the REC-ASS terminal, the voltage applied to the capstan motor 14 would scarcely changes. The continuity of track phase and CTL interval before and after the editing point is maintained by the inertia of the motor. After the editing point, the capstan speed deviation compensating circuit 28 conversely substitutes for the phase servo circuit and stably maintains the revolution speed of the capstan motor 14 constant.

Figure 2:
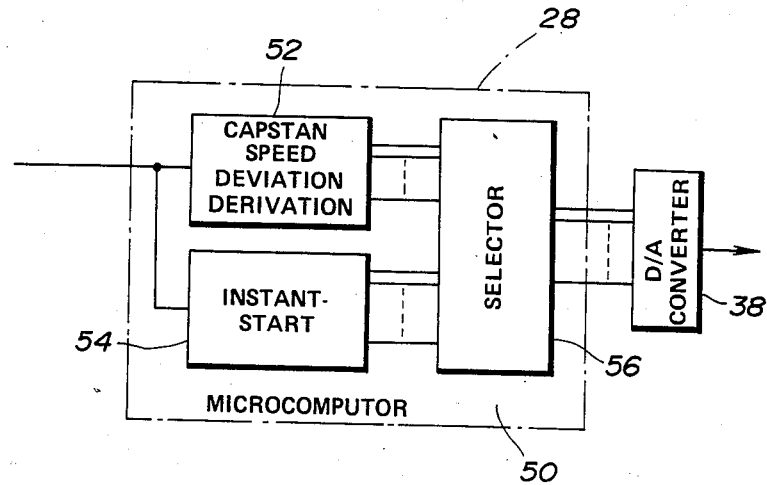
FIG. 2 is a block diagram of a modified speed veviation compensating circuit to be employed in the first embodiment of the capstan servo system of FIG. 1.

FIG. 2 shows a modification of the capstan speed deviation compensating circuit 28 employed in the first embodiment of the capstan servo system of FIG. 1. A microcomputer 50 is employed as a replacement of the foregoing embodiment of the capstan speed deviation compensating circuit 28. The microcomputer 50 is illustrated in the form of function blocks and includes a capstant speed deviation derivation block 52 which performs the functions of the capstan speed indicative signal counter 30 and the comparator 34 of the former embodiment. The microcomputer 50 is also provided with an instant-start block 54 which quickly accelerate the capstan motor 14 to the predetermined speed and locks the revolution speed of the capstan motor 14 at the reference value in a short time after the capstan motor starts. The capstan speed deviation derivation block 52 and the instant-start block 54 are connected to the D/A converter 38 via a selector block 56. The selector block 56 is adapted to selectively feed one of the outputs of the capstan speed deviation derivation block 52 and the instant-start block 54 to the D/A converter.

Figure 3:
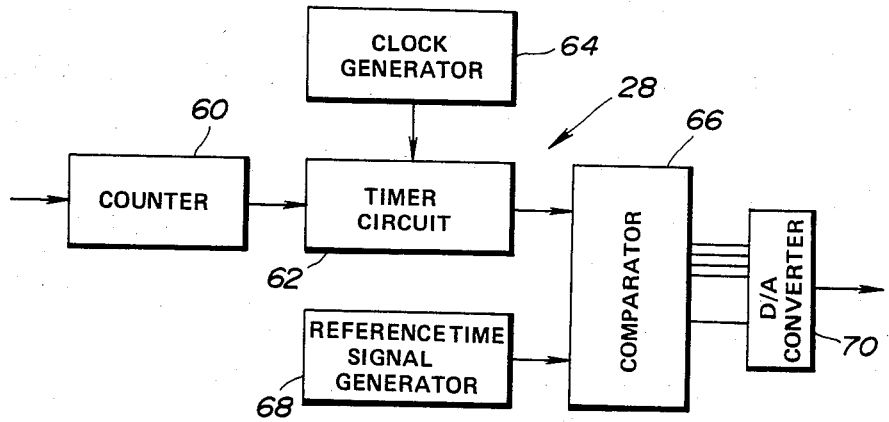
FIG. 3 is a block diagram of another modification of the the speed deviation compensating circuit to be employed in the first embodiment of the capstan servo system of FIG. 1.

FIG. 3 shows another modification of the capstan speed deviation compensating circuit 28 of the foregoing first embodiment of the capstan servo system of FIG. 1. In this modification, the capstan speed deviation is derived by measuring elapsed time for counting a predetermined number of capstan speed indicative signal pulses and comparing the measured period of time with a reference time. For this purpose, the capstan speed deviation compensating circuit 28 is provided with a capstan speed indicative signal counter 60 which is essentially same construction to that of the counter 30 in the former embodiment and adapted to count a given number of capstan speed indicative signal pulses. The capstan speed deviation compensating circuit 28 of FIG. 3 is also provided with a timer circuit 62. The timer circuit 62 is connected to a clock generator 64 which produces clock pulses CK. The timer circuit 62 counts up the clock pulses CK from the clock generator 64 and whereby measures the elapsed time for counting the given number of the capstan speed indicative signal pulses. The timer circuit 62 produces a timer signal having a value indicative of the measured elapsed time. The timer signal is fed to a comparator 66. The comparator 66 is also connected to a reference time signal generator 68 to receive a reference time indicative signal which has a value representative of a reference time for counting the given number of the capstan speed indicative signal pulses.

Similarly to the comparator 34 in the foregoing first embodiment, the comparator 66 produces a comparator signal having a value indicative of a difference between the timer signal value and the reference time indicative signal value. The comparator signal is converted into a difference indicative voltage signal by means of a D/A converter 70 and then fed to the b terminal of the adder 18 via the change-over switch 24.

It is further possible to modify the capstan speed deviation compensating circuit 28 of FIG. 1 in manner to set a center value at a reference count value, e.g. 1800 in 2 seconds. In this case, the capstan speed indicative signal counter may be arranged to produce a counter signal having a value representative of a deviation value from the center value. If necessary, a decoder may be connected to the capstan speed indicative signal counter for decoding the deviation indicative counter value. With such an arrangement, the comparator 34 and the reference value generator becomes unnecessary.

Figure 4:
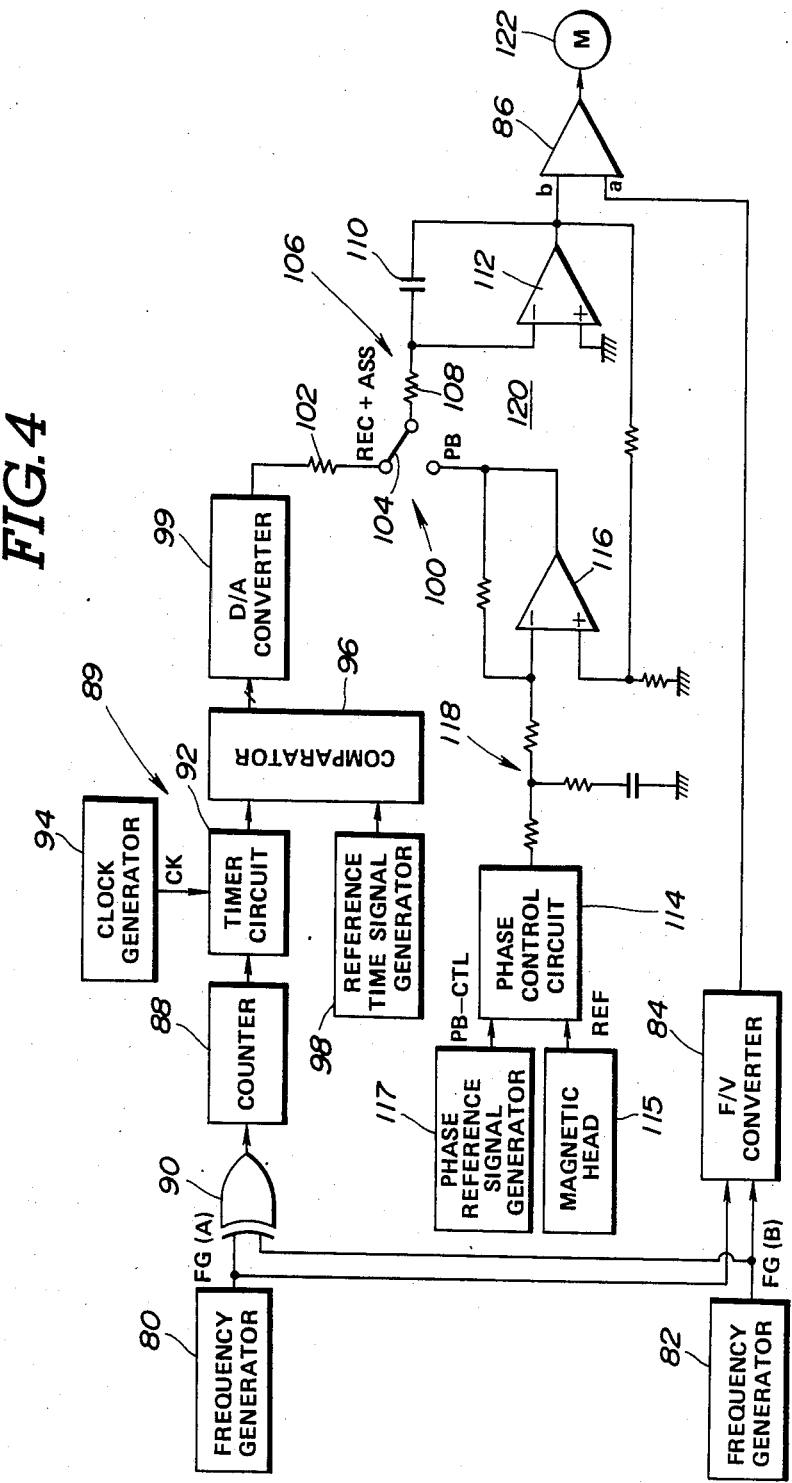
FIG. 4 is a block diagram of the second combodiment of a capstan servo system according to the invention.

FIG. 4 shows the second embodiment of a capstan servo system according to the invention. In this second embodiment, a pair of frequency generators 80 and 82 respectively produces pulse-train form capstant speed indicative signals FG(A) and FG(B). Similarly to the foregoing first embodiment, the signal phases of the capstan speed indicative signals FG(A) and FG(B) are mutually shifted at a given angle, e.g. 90° from each other. The frequency generators 80 and 82 are connected to an F/V converter 84. The F/V converter 84 generates a voltage signal having a voltage corresponding to the frequency of the input capstan speed indicative signals FG(A) and FG(B). The voltage signal of the F/V converter 84 is fed to an adder 86.

On the other hand, the frequency egenerators 80 and 82 are also connected to a capstan speed indicative signal counter 88 of a capstan speed deviation compensating circuit 89 via an EX-OR gate 90. The capstan speed indicative signal counter 88 is adapted to produce a counter signal whnever the couter value thereof reaches a given value, e.g. 1800. A timer circuit 92 is connected to the capstan speed indicative signal counter 90 and, in turn, to a clock generator 94. The timer circuit 92 is responsive to the counter signal from the counter 88 to latch the instantaneous timer value which is representative of the elapsed time for counting the given number of the capstan speed indicative signal pulses. The timer circuit 92 feeds a timer value indicative signal to a comparator 96. The comparator 96 also receives a reference time indicative signal from a reference time signal generator 98. The comparator 96 thus derives a difference between the timer signal value and the reference time indicative signal value and thus produces a comparator signal having a value indicative of the derived difference. The comparator signal of the comparator 96 is converted into a voltage signal serving as a capstan speed deviation indicative signal by means of a D/A converter 99. The capstan deviation indicative signal is fed to the REC and the ASS terminal of a change-over switch 100 via a resistor 102.

The change-over switch 100 has a movable contact 104 connected to the b terminal of the adder 86 via an integration circuit 106. The integration circuit 106 comprises a resistor 108, a capacitor 110 and an operational amplifier 112.

On the other hand, the second embodiment of the capstan servo system of FIG. 4 has a phase control circuit 114 connected to a reproducing magnetic head 115 to receive therefrom a control signal CTL recorded on a control track. The phase control circuit 114 is also connected to a phase reference signal generator 117 which is adapted to produce a phase reference signal indicative of a reference phase. The phase control circuit 114 derives a phase error between the reproduced control signal PB-CTL and the phase reference signal REF and produces a phase-error indicative signal. The phase-error indicative signal of the phase control circut 114 is input to the inverting input of a differential amplifier 116 via a low-pass filer 118. A non-inverting input of the differential amplifier 116 is connected to the aforementioned integration circuit 106 to receive therefrom an integrated value indicative signal. On the other hand, the output of the differential amplifier 116 is connected to the PB terminal of the change-over switch 100.

The differential amplifier 116 and the integration circuit 106 forms a low-pass filter 120.

In the operation of the aformentioned second embodiment of the capstan servo system of FIG. 4, when the recording and/or reproducing apparatus is operated in PLAY mode, the movable contact 104 of the change-over swtich 100 contacts with PB terminal. Therefore, the phase-error indicative signal is fed to the b terminal of the adder 86. The adder 86 produces a voltage signal having a voltage of the sum value of the capstan speed indicative voltage signal value from the F/V converter 84 and the phase error indicative signal. By on the sum value indicative voltage signal, the capstan motor 122 is driven at the controlled revolution speed to reduce the phase-error between the reproduced control signal PB-CTL and the phase reference signal REF to zero.

During the aforementioned phase-error dependent feedback control for the capstan motor 122, the capacitor 110 of the integration circuit 106 is charged by the phase-error indicative signal.

When the operation mode of the recording and/or reproducing apparatus ios switched from the PLAY mode to REC mode or ASS mode, the movable contact 104 of the change-over switch 100 is switched to the switch position to contact with the REC and ASS terminal. Thus, the capstan speed deviation compensating circuit 89 is connected to the b terminal of the adder 86 via the resistor 102 and the integration circuit 106.

Upon switching operation, there is a difference between the valtages of the phase-error indicative signal and the capstan speed deviation indicative signal. The voltage difference corresponds to the phase-error dependent compensation value. Assuming that the resistance values of the resistors 102 and 108 are respectively $R_{33}$ and $R_{38}$, and the capacity of the capacitor 110 is $C_{34}$, the voltage across the capacitor 110 varies according to the time constant of $C_{34}(R_{33}+R_{38})$. Therefore, the voltage to be applied to the b terminal of the adder 86 varies gradually. This appartently improve the transient characteristics of the capstan servo system when the operation mode of the recording and/or reproducing apparatus is switched between the PLAY mode and the REC or ASS mode.

It should be noted that the resistance $R_{102}$ and $R_{108}$ of the resistors 102 and 108 may partically be set at 1 KΩ and 47 KΩ, respectively.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A capstan servo system for a video tape recorder, comprising:
   means for generating pulse trains in response to rotation of a tape capstan;
   means for controlling a rotation speed of said tape capstan by a control signal having a corresponding magnitude to frequency variation of said pulse trains;
   means for producing a phase error between a reference pulse and a control track pulse that is recorded in a longitudinal direction of tape;
   means connected to said generating means for detecting a deviation of said pulse trains from a reference value at every predetermined period; and
   switching means for supplying output of said producing means to said controlling means in a reproducing mode of said video tape recorder and supplying output of said detecting means to said controlling means in a recording mode thereof.

2. A capstan servo system according to claim 1, in which said detecting means comprising means for counting a number of said pulse trains within said predetermined period and means for comparing output value of said counting means with said reference value.

3. A capstan servo system according to claim 1, in which said detecting means comprises means for counting said pulse trains to predetermined pulse counts and generating a indication pulse representing said predetermined period, means for detecting a time interval that is determined by said indication pulse and means for comparing output value of said time interval detecting means with said reference value.

4. A capstan servo system according to claims 2 or 3, in which said comparing means comprises a digital comparator and said detecting means further comprises a digital to analog converter for converting the output of said digital comparator to the corresponding analog signal and a level shifter for adding a predetermined DC level to said analog signal.

5. A capstan servo system according to claim 2 or 3, in which said detecting means further comprises an means for storing said phase error of said producing means in the reproducing mode, said storing means being connected with said detecting means in the recording mode for superimposing said phase error with the output of said detecting means.

6. A capstan servo system for a video tape recorder, comprising:
   a pulse generator for generating pulse trains in response to rotation speed of capstan motor;
   circuit connected to said pulse generator for producing a speed error of said capstan motor by detection of frequency variation of said pulse trains,
   circuit for producing a phase error between a reference pulse and a control track pulse that is recorded in a longitudinal direction of tape;

circuit connected to said pulse generator for detecting a deviation of a number of said pulse trains at every predetermined period;

a switch circuit for selectively switching between outputs of said phase error producing circuit and said detecting circuit so that the output of said phase error producing circuit is supplied therefrom in a reproducing mode and the output of said detecting means is supplied therefrom in a recording mode;

an integrating circuit connected to said switch circuit; and an adder for adding said speed error with an output of said integrating circuit to generate a control signal by which said capstan motor is controlled.

7. A capstan servo system according to claim 1, in which said detecting means comprises means for counting a number of said pulse trains within said predetermined period and means for comparing output value of said counting means with said reference value.

8. A capstan servo system according to claim 1, in which said detecting means comprises means for counting said pulse trains to predetermined pulse counts and generating a indication pulse representing said predetermined period, means for detecting a time interval that is determined by said indication pulse and means for comparing output value of said time interval detecting means with said reference value.

9. A capstan servo system according to claim 7 or 8, in which said phase error producing circuit further comprises a low-pass-filter to which said phase error is applied and a differential amplifier for subtracting an output of said low-pass-filter from the output of said integrating circuit.

10. A capstan servo system for a video tape recording and/or reproducing apparatus comprising:

a capstan motor for rotatingly driving a capstan;

a sensor means for monitoring revolution of said capstan motoer and producing a sensor signal representative of a capstan speed;

a magnetic head means for reproducing at least a control signal recording on said video tape;

a captan speed error dependent feedback system deriving a capstan speed error relative to a predetermined speed for deriving a capstant speed error dependent control value for adjusting revolution speed of said capstan motor based thereon;

a phase error dependent feedback system deriving a phase error between a reproduced control signal and a predetermined phase reference signal for deriving a phase error dependent control value for adjusting revolution speed of said capstan motor based thereon; and a switching means, responsive to change of operation mode of said recording and/or reproducing apparatus, for selectively making one of said casptan speed error dependent feedback system and said phase error dependent feeback system effective to said capstan motor for feedback controlling said capstan speed depending upon selected operation mode.

11. A capstan servo system as set forth in claim 10, wherein said switching means selects said capstan speed error dependent feedback system for feedback controlling said capstan speed when one of recording mode and assembly edit mode of said recording and/or reproducing apparatus is selected, and selects said phase error dependent feedback control when reproducing mode of said recording and/or reproducing apparatus is selected.

12. A capstan servo system as set forth in claim 11, which further comprises a transient control means, active upon switching effective feedback control systems between said capstan speed error dependent feedback control system and said phase error dependent feedback control system in response to change of operation mode of said recording and/or reproducing apparatus for gradually varying said control value in former feedback control system to said control value in the later feedback control system.

13. A capstan servo system as set forth in claim 12, wherein said transient control means is active in response to switching of operation mode of recording and/or reproducing apparatus from reproducing mode to recording mode or assembly edit mode.

* * * * *